(12) United States Patent
Jindal et al.

(10) Patent No.: US 9,003,441 B1
(45) Date of Patent: Apr. 7, 2015

(54) PROBABILISTIC INFERENCE OF DEMOGRAPHIC INFORMATION FROM USER SELECTION OF CONTENT

(75) Inventors: Deepak Jindal, Sunnyvale, CA (US); Gokul Rajaram, Mountain View, CA (US)

(73) Assignee: Google Inc., Mountain View, CA (US)

( * ) Notice: Subject to any disclaimer, the term of this patent is extended or adjusted under 35 U.S.C. 154(b) by 2129 days.

(21) Appl. No.: 11/105,781

(22) Filed: Apr. 13, 2005

(51) Int. Cl.
*H04N 7/10* (2006.01)
*H04N 7/025* (2006.01)
*H04N 21/442* (2011.01)

(52) U.S. Cl.
CPC .............................. *H04N 21/44213* (2013.01)

(58) Field of Classification Search
USPC ................. 725/9–21, 32, 46, 86–104; 705/10
See application file for complete search history.

(56) References Cited

U.S. PATENT DOCUMENTS

| | | | |
|---|---|---|---|
| 6,286,005 B1 * | 9/2001 | Cannon | 1/1 |
| 6,981,040 B1 * | 12/2005 | Konig et al. | 709/224 |
| 7,085,682 B1 * | 8/2006 | Heller et al. | 702/186 |
| 2002/0032904 A1 * | 3/2002 | Lerner | 725/14 |
| 2004/0059712 A1 | 3/2004 | Dean et al. | |
| 2005/0050027 A1 | 3/2005 | Yeh et al. | |
| 2007/0240181 A1 * | 10/2007 | Eldering et al. | 725/14 |

OTHER PUBLICATIONS

Bozios, T. G. Lekakos, V. Skoularidou, and K. Chorianopoulos. 2001. "Advanced techniques for personalized advertising in a digital TV environment: The imedia system." In *Proceedings of the eBusiness and eWork Conference*.
MacDonald, R. and Silver, D., 2002, "Web-based User Profiling Using a Recurrent Neural Network," *Proceedings of the IASTED International Conference on Artificial Intelligence and Soft Computing (ASC2002)*, Banff, Alberta, Jul. 2002, H. Leung (Ed.), ACTA Press, p. 472-477.
Pramataris, K., Papakyriakopoulos, D., Lekalos, G., Mylonopolous, N., "Personalized Interactive TV Advertising: The IMEDIA Business Model," Journal of Electronic Markets, vol. 11 (1): 1-9 (2001).
Schiaffino, S., Amandi, A., "User Profiling with Case-Based Reasoning and Bayesian Networks," Open Discussion Proceedings, IBERAMIA-SBIA 2000, Atibaia, Brazil, Nov. 2000, pp. 12-21.

* cited by examiner

*Primary Examiner* — John Schnurr
*Assistant Examiner* — Christine Kurien
(74) *Attorney, Agent, or Firm* — Foley and Lardner LLP; John D. Lanza

(57) ABSTRACT

Demographic information for users and content are collected based on users' content selections. Each user is associated with some demographic data. Users who select particular content, such as an advertisement or a web page, are probabilistically inferred to be in the demographic associated with the content. The demographic data of users who selected the content are aggregated into visitor demographic data for the content. The demographic associated with the content may be modified based on the visitor demographic data. A feedback loop is formed, whereby the demographic data of both users and the content are continuously refined.

21 Claims, 5 Drawing Sheets

200

| User | Demographic Characteristic | | | | |
|---|---|---|---|---|---|
| | Gender=male | Gender=female | Age=0-10 | Age=11-20 | |
| User1 | 0.75 | 0.25 | 0 | 0.12 | ... |
| User2 | 0.10 | 0.90 | 0 | 0.21 | |
| User3 | 0 | 1 | 0.20 | 0.50 | |
| ... | | | | | |

| Demographic Characteristic | Probability |
|---|---|
| Gender=male | 0.1 |
| Gender=female | 0.9 |
| Age=0-10 | 0.1 |
| ... | ... |

FIGURE 2B

PROBABILISTIC INFERENCE OF DEMOGRAPHIC INFORMATION FROM USER SELECTION OF CONTENT

TECHNICAL FIELD

The disclosed embodiments relate generally to inferring demographic information associated with computer users and content (e.g., web pages) accessed by computer users. More particularly, the disclosed embodiments relate to the inference of demographic information from user selection of content from a network.

BACKGROUND

Content providers and advertisers often use demographic information to better target their content and advertisements. Better targeting of content and advertisements reduces the likelihood that the content or advertisement will be ignored by users.

One way content providers and advertisers collect demographic information online is through user registration. When registering with a website, users may be asked questions about their demographic information. Websites can use the users' responses to better target their content and/or advertisements. However, many users view website registrations as inconvenient and intrusive of their privacy. Thus, many users provide false information when questioned during registration about their demographic information. Furthermore, even if a user provides correct information, the information can become outdated.

Content providers and advertisers can also collect demographic information through surveys. However, surveys also suffer similar shortcomings as user registration; users can provide false information on the surveys and the information can become outdated. Furthermore, users can and often do ignore the surveys.

SUMMARY

According to an aspect of the invention, a method of inferring demographic information includes associating target demographic data with content, identifying user demographic data for a user in response to selection of the content by the user, and modifying the user demographic data in accordance with the target demographic data.

BRIEF DESCRIPTION OF THE DRAWINGS

For a better understanding of the aforementioned aspects of the invention as well as additional aspects and embodiments thereof, reference should be made to the detailed description of the embodiments below, in conjunction with the following drawings in which like reference numerals refer to corresponding parts throughout the figures.

FIGS. 2A-2B are diagrams of exemplary user demographic data structures, according to some embodiments of the invention.

DETAILED DESCRIPTION OF THE EMBODIMENTS

Demographic data of users who select particular content are collected and aggregated into visitor demographic data for the content. The content may include an advertisement or a web page. The user demographic data of a user who selected the content is modified based on the target demographic data of the content; the user is inferred to have the demographic characteristics(s) specified by the target demographic data, based on the user's selection of the content. The target demographic data of the content may be modified based on the visitor demographic data of the content. A feedback loop of modifying the target demographic data of content based on visitor demographic data and vice versa is formed. The feedback loop continuously refines the demographic data of users and content.

Figure 1:
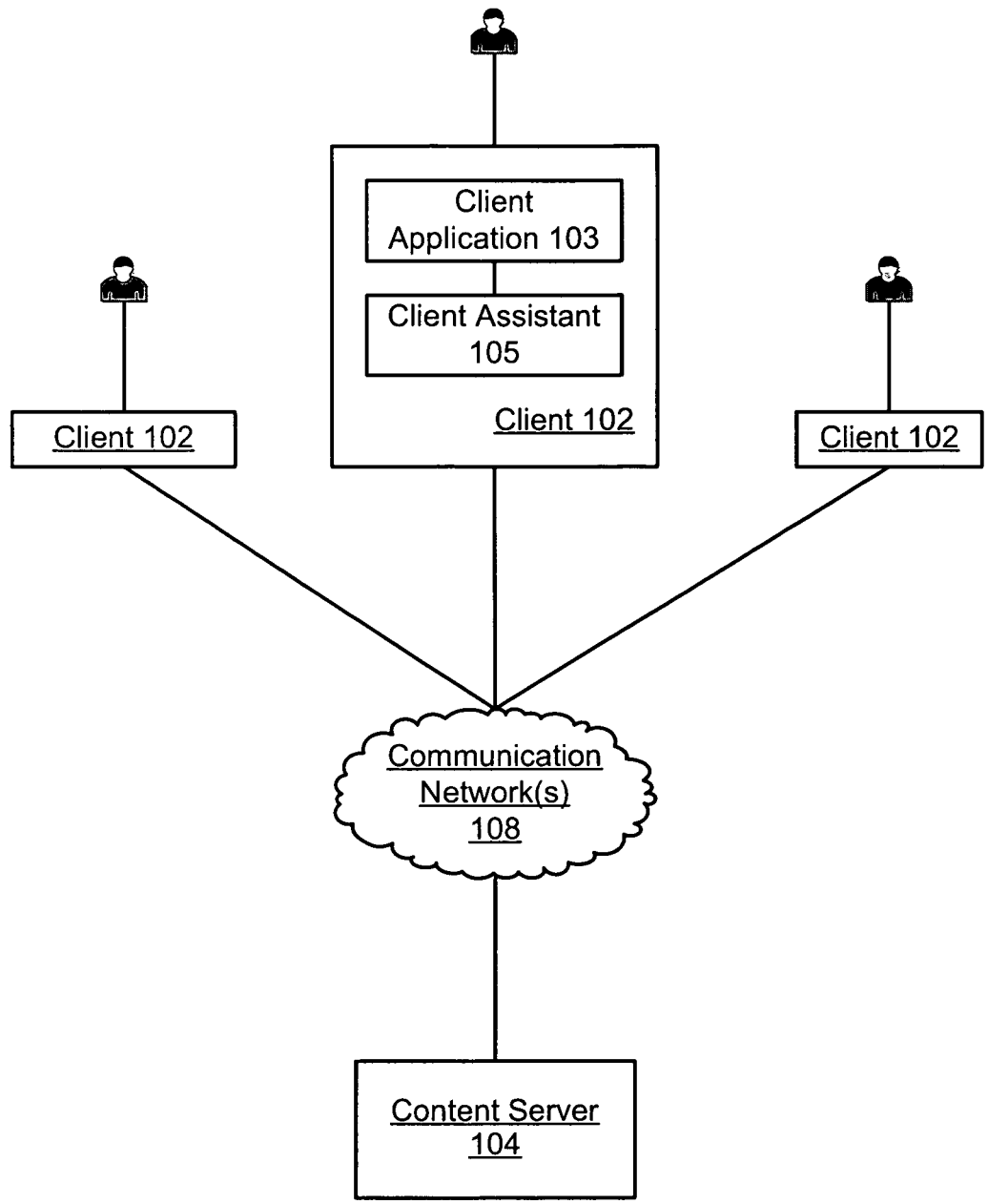
FIG. 1 is a block diagram of an exemplary network environment, according to some embodiments of the invention.

FIG. 1 illustrates an exemplary network environment, according to some embodiments of the invention. The network environment includes one or more clients 102, and a content server 104. Client 102 includes a client application module 103, such as a web browser. Client 102 may also include a client assistant 105. The network environment also includes one or more communication network(s) 108 that interconnect these components.

A content server 104 distributes content (e.g., web pages, images, documents, files, advertisements, other forms of information), many of which are associated with some target demographic data. The content may include many files or other data structures of various types, and those files or data structures can include any combination of text, graphics, video, audio, etc.

A user, having one or more demographic characteristics, selects particular content through the client application 103. A probabilistic determination of the user's demographic characteristics and other users who selected the content is aggregated into visitor demographic data for the content at content server 104. The user is inferred to have an increased probability of fitting the target demographic data of the content. The visitor demographic data of the content may be a basis for modifying the target demographic data associated with the content.

Each user has or is associated with a set of demographic characteristics. For example, a user may have the demographic characteristics of being a male, being in the 21-45 age range, having a college degree, etc. A demographic characteristic is a combination of a demographic variable and a particular value for the variable. A demographic variable is any one of the many criteria that may be used for classifying users. The demographic variables included in the demographic data may be one or more of the group consisting of age, gender, income, geographic location, education, wealth, religion, race, ethic group, marital status, household size, employment status, and political party affiliation. A value for a demographic variable is a segment for the demographic variable into which a user may be classified. For example, for the demographic variable "gender", the possible demographic characteristics may be "gender=male" and "gender=female," with "male" and "female" being possible values (i.e., the possible segments into which users may be classified) for the demographic variable "gender."

Sometimes it is difficult to determine exactly the demographic data of a user (e.g., outdated data, incorrectly supplied data). Thus, in some embodiments, the user demographic data that is associated with a user is a probabilistic approximation of the user's true demographic data. For example, for a user who is male, the user demographic data may show a high probability (e.g., 0.90) of the user being male and a low probability (e.g., 0.10) of the user being female.

Content may be associated with some target demographic data. The target demographic data represents the content provider's desired target demographic for the content. That is, the target demographic data represents the population of users, with particular demographic characteristics, to which the content provider wishes to target with the content. The target demographic data may be represented in absolute terms (e.g., "males between 20-45 years old") or, in some embodiments, probabilistically (e.g., "90% male, 10% female, 5% 0-10 years old, 15% 11-20 years old, 80% 20-45 years old").

FIGS. 2A and 2B illustrate exemplary user demographic data structures, according to some embodiments of the invention. Content server 104 can store user demographic data for a plurality of users in a data structure, such as a table 200. In some embodiments, the data structure 200 may be a table such as the one shown in FIG. 2A. A client 102 may also store user demographic data for a user of the client 102 in a data structure, such as a table 250, shown in FIG. 2B.

In FIG. 2A, the table stores identifiers for a plurality of users 202, and for each user, a plurality of probability values associated with particular demographic characteristics 204. Each demographic characteristic may be represented as a name-value pair, with the name being a demographic variable and the value being a value for that demographic variable. For example, data structure 200 includes exemplary demographic characteristics, including "Gender=male" 212, "Gender=female" 214, "Age=0-10" 216, and "Age=11-20" 218. The demographic characteristics 204 shown in FIG. 2A are only exemplary. In some embodiments, demographic characteristics 204 may include a superset or subset of the demographic characteristics illustrated in data structure 200.

Per demographic characteristic per user, data structure 200 stores a probability of the respective user having the respective demographic characteristic. The probability values shown in data structure 200 are merely exemplary; various probability values may be used. It should be noted that the probability values for any one demographic variable (i.e., probability values for all demographic characteristics associated with a demographic variable) for particular user sums to a value of 1, or equivalent.

In data structure 200, the user demographic data of a user is the one or more probability values for the set of demographic characteristics associated with the user. The data structure 200 includes a respective row or record (206, 208, 210) of data for each respective user for whom demographic data is stored. For example, the demographic data 208 for User2 indicates that User2 has a 0.90 probability of being female (as shown at 220) and a 0.21 probability of being 11-20 years old (as shown at 222). Those two probability values, along with other probability values, form the user demographic data 208 of User2.

In some embodiments, user demographic data may be stored at a client 102. Client 102 may store user demographic data for a user of client 102. The user demographic data of the user, stored at the client 102, may mirror the user demographic data for the user that is stored at content server 104. In some embodiments, the user demographic data at client 102 may be stored in a data structure such as the table 250, shown in FIG. 2B. The table 250 stores a plurality of demographic characteristics 252 and associated probabilities 254 for the user. The table 250 may store the complete user demographic data for a user. The table 250 of demographic data for a particular user corresponds to, or stores the same or similar information to a record (206, 208, 210) of the data structure 200. In some embodiments, the user demographic data may be stored at the client 102 as one or more cookies. A cookie that stores demographic data may store data representing one demographic characteristic and an associated probability, or it may store data representing multiple demographic characteristics and associated probabilities.

It should be appreciated, however, that user demographic data may be stored at both client 102 and content server 104, exclusively at client 102, or exclusively at content server 104.

Figure 3:
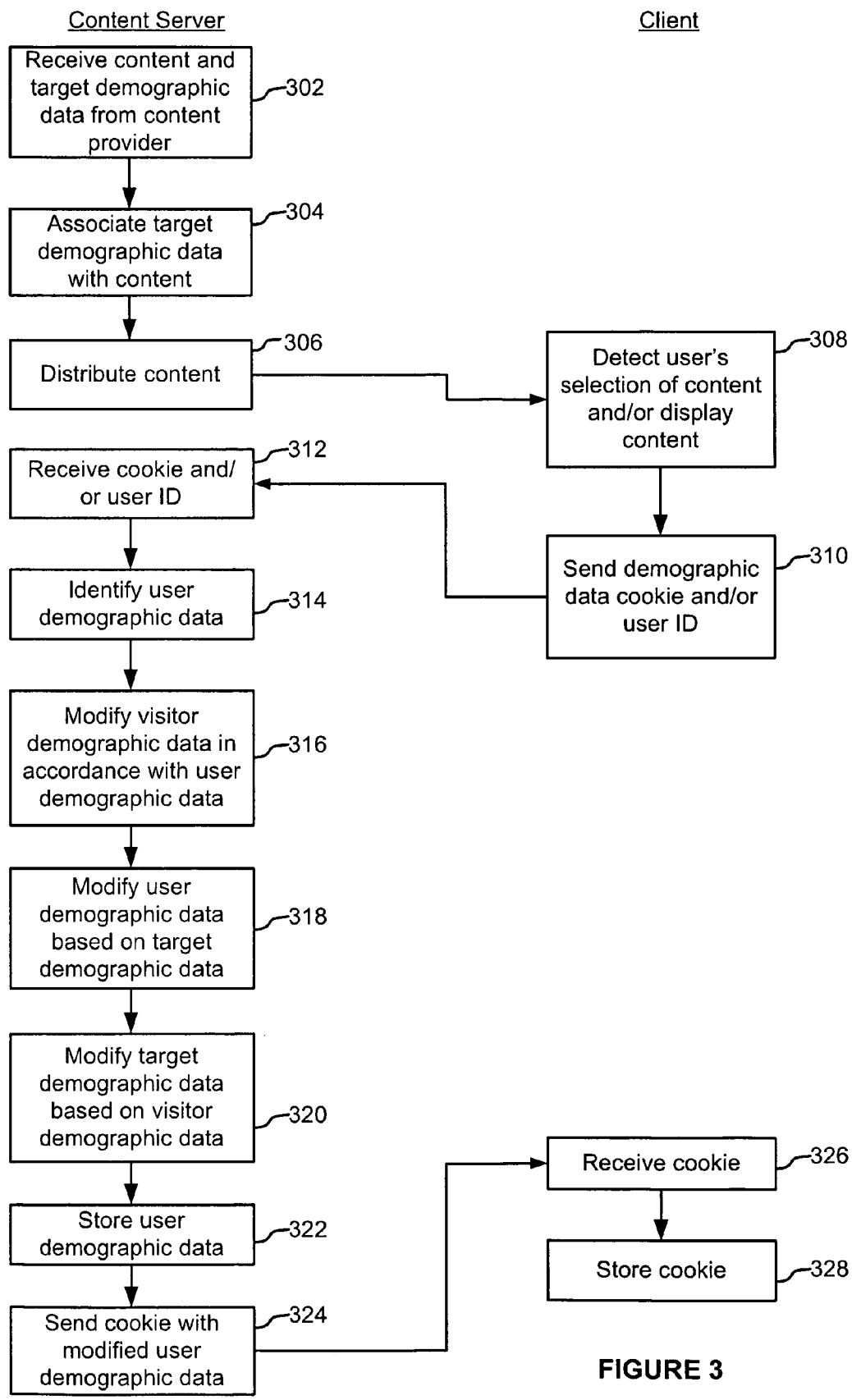
FIG. 3 is a flowchart illustrating an exemplary process for modifying user demographic data and modifying target demographic data based on user selection of content, according to some embodiments of the invention.

FIG. 3 illustrates an exemplary process for modifying user demographic data and modifying target demographic data based on user selection of content, according to some embodiments of the invention. Content server 104 receives content and some initial target demographic data from a content provider (302). Content may be associated with target demographic data that represents the content provider's desired target demographic for the content. That is, the target demographic data represents the population of users, with particular demographic characteristics, to which the content provider wishes to target with the content. The initial target demographic data represents the content provider's initial desired target demographic for the content. Content server 104 associates the initial target demographic data with the content (304).

In some embodiments, the target demographic data may be represented, in absolute terms, by one or more demographic characteristics. The demographic characteristics may be connected by Boolean operators such as "AND" or "OR". For example, if the target demographic of particular content is males between 21-45 years old, then the target demographic data of that content may be "Gender=male AND Age=21-45." If, for other content, the target demographic is males between 45-65 and females between 21-65, then the target demographic data for that content may be "(Gender=male AND Age=45-65) OR (Gender=female AND (Age=21-45 OR Age=46-65))." In alternative embodiments, the target demographic data may be represented probabilistically, as one or more probability values, with each probability value associated with a particular demographic characteristic. For example, the target demographic data of particular content, such as an advertisement, may indicate that the target demographic is 0.1 male and 0.9 female and 0.5 age 21-45 and 0.5 age 46-65.

The content is distributed (306). The way the content is distributed may vary depending on the type of content. For example, if the content is an advertisement, the advertisement may be distributed by displaying the advertisement in conjunction with or at the same time as other content, such as a web page or an email message. If the content is a web page, the web page may be distributed by including hyperlinks to the web page in other content. Whatever the type of content, the distribution may be achieved by automated processes and/or manual intervention.

Client 102 detects a user's selection of the content and/or display the content (308). The user selection of the content is an affirmative act by a user that indicates the user's interest in the content. Based on that affirmative indication of interest, the user may be inferred to be in the target demographic of the content. In other words, the user is inferred to have the demographic characteristic(s) listed in the target demographic data of the content. To make the demographic inference, the user selection of the content is first detected. The content may also be displayed as well, depending on whether a display of the content is needed before the user can affirmatively select it.

For example, if the content is an advertisement, the user selection of the advertisement is the user's click-through of the advertisement (the click-through is the affirmative indication of interest). In order for the user to be able to click on the advertisement, the advertisement has to be displayed to the user first. On the other hand, if the content is a web page, the user selection of the web page is a visit of the web page, e.g., by clicking on a hyperlink to the web page or typing in the address of the web page into the address bar of a web browser (the hyperlink clicking or address typing to request the web page is the affirmative indication of interest). The web page does not have to be displayed before the user selects it; the user can type in the web page address or click on a hyperlink to the web page without seeing the web page first.

In some embodiments, the detection of the user selection may also include determining if the user's selection of the content is intentional. Sometimes, a user may select certain content by accident. To avoid circumstances where a user is inferred to have an increased probability of having particular demographic characteristics based on unintentional selections of content, additional determinations may be made to filter out the accidental content selections. For example, if the content is a web page, the client assistant 105 may time the user's visit to the web page from when the user selected the web page (e.g., by clicking on a hyperlink or typing in the address). The visit may be considered to be an intentional user selection if the visit time exceeds a predefined threshold.

Client 102 may send one or more cookies to content server 104 (310). The cookie(s) may include the user demographic data of the user that is stored at client 102. Client 102 may also send a user ID in addition to, or in lieu of, the cookie(s) that include the user demographic data. The user ID may be used to identify the user demographic data for the user, stored in a data structure at content server 104, such as the data structures described above in relation to FIG. 2. In some embodiments, the cookie(s) that include the user demographic data and/or the user ID also include an identifier of the selected content, e.g., the address of a selected web page, that triggered the sending of the user demographic data and/or user ID.

Content server 104 receives the user demographic data cookie(s) and/or the user ID (312). Content server 104 identifies the user demographic data, directly from the cookie(s) received from client 102 or from a data structure at content server 104, such as the data structures described above in relation to FIG. 2, using the user ID (314). Content server 104 identifies the visitor demographic data of the content selected by the user and modifies the visitor demographic data, based on the identified user demographic data (316). The visitor demographic data may be modified by mathematically combining it with the user demographic data. For example, a new visitor demographic could be constructed by a weighted combination of the user demographic of the users who have visited the content. Alternately, the visitor demographic data may be modified by mathematically adding the user demographic data to the visitor demographic data and incrementing a visitor count value.

$$VisitorDemographic = \sum_{i} UserDemographicData(Visitor_i)$$

$$VisitorCount = i$$

$$NormalizedVisitorDemographic = VisitorDemographic / VisitorCount$$

In these embodiments, the visitor demographic data can be normalized by dividing the accumulated visitor demographic data by the visitor count. It is noted that by summing the user demographic data of the content visitors, and by not retaining any of the individual user demographic data, the privacy of the individual content visitors is protected. It should be appreciated that the methods of modifying the visitor demographic data described above are merely exemplary and other methods may be used.

The visitor demographic data of content, which is distinct from the target demographic data of the content, is the aggregate of the user demographic data of users who have selected the content. The visitor demographic data may be stored as one or more demographic characteristics and associated probabilities. In some embodiments, the visitor demographic data of the content may be stored along with the content, at content server 104.

The user demographic data of the user is modified based on the target demographic data of the content (318). That is, the user demographic data is modified such that it correlates more closely with the target demographic data of the content. The modification may be performed by mathematically combining the user demographic data with the target demographic data. For example, a user's demographic could be constructed by a weighted combination of the demographics of the content that the user has visited. An exemplary update equation is:

$$UserDemographic_i = (1-\alpha)UserDemographic_{i-1} + (\alpha)TargetDemographic$$

wherein $\alpha$ is a weighting factor between 0 and 1 and i represents a version number of the user demographic data. In this update equation, the user demographic and target demographic values are treated as vectors or arrays whose individual elements contain values for different demographic characteristics. It should be appreciated that the methods of modifying the user demographic data described above are merely exemplary and other methods may be used.

In some embodiments, the target demographic data of the content may be modified based on the visitor demographic data of the content (320). For any particular content, the expectation of the content provider is that the visitor demographic data of the content correlates with the target demographic data of the content. That is, users who selected the content generally fit the target demographic of the content. However, the visitor demographic data may diverge from the target demographic data if an unexpectedly large number of users who do not fit the target demographic select the content. In some embodiments, the target demographic data may be modified, by content server 104, based on the visitor demographic data. The target demographic data may be modified by mathematically combining it with the visitor demographic data. For example:

$$TargetDemographic_i = \frac{(1-\beta)TargetDemographic_{i-1} + (\beta)NormalizedVisitorDemographic}$$

where $\beta$ is a weighting or mixing factor (e.g., a value between 0.01 and 0.5).

In this way, the target demographic data of the content, which is the target demographic of the content, is modified so that it better reflects the population of users who are most likely to select the content. The modification to the target demographic data may involve replacing demographic characteristics in the target demographic data, or adjusting probability values in the target demographic data, or both. It should be appreciated that the methods of modifying the target demographic data described above are merely exemplary and other methods may be used.

In alternative embodiments, the visitor demographic data may be provided to the content provider. The content provider modifies the target demographic data based on the content provider's analysis of the visitor demographic data. The modifications are submitted to content server 104 by the content provider. Content server 104 updates the target demographic data of the content to reflect the modifications made by the content provider.

The modified user demographic data is stored in the data structure at content server 104, such as the ones described above in relation to FIG. 2, and/or in one or more cookies that may be sent to client 102 (322). The cookie(s) with the updated user demographic data may be sent to client 102 (324). Client 102 receives the cookie(s) (326) and stores the user demographic data contained therein, as cookie(s) or in a data structure at client 102 (328).

It should be appreciated that after the initial provision of the content and an association of an initial target demographic with the content, the content does not need to be provided again by the content provider in order for other users to be able to select the content or to have demographic data of users or the content modified. Thus, after the initial provision of the content, subsequent iterations of the process of FIG. 3, for the same content, may begin at 306 rather than at 302. If the content provider modifies the target demographic data, the modified data may be associated with the already-provided content and the content provider does not have to re-provide the content.

In alternative embodiments, the user demographic data, the visitor demographic data, and the target demographic data may be modified periodically, rather than after each user selection. In the time between scheduled updates, content server 104 may store records of user selections of content and the user demographic data of those users who selected the content. At the time of a scheduled update, the visitor demographic data of the content is modified based on the stored user demographic data. The user demographic data of a user is modified, using the selection records to identify which content was selected by the user. At the time of the update, the target demographic data of particular content may also be modified based on the visitor demographic data of the content.

Figure 4:
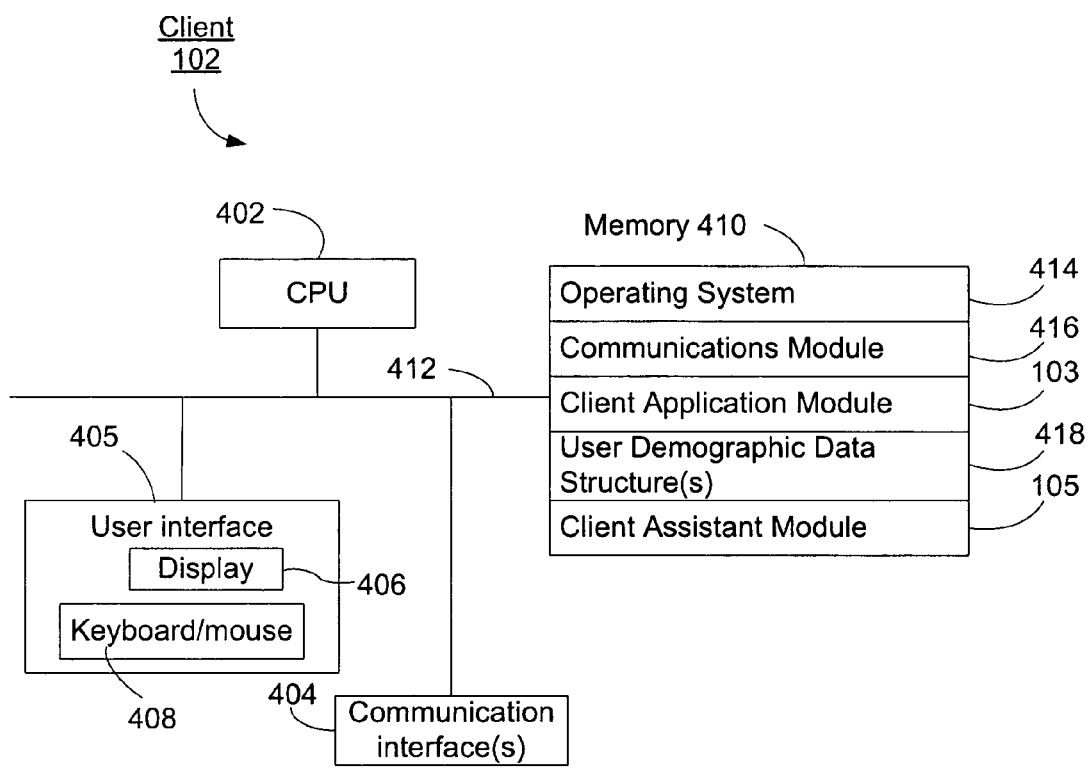
FIG. 4 is a block diagram illustrating an exemplary client, according to some embodiments of the invention.

FIG. 4 illustrates an exemplary client 102, according to some embodiments of the invention. Client 102 includes at least one data processor or central processing unit (CPU) 402; memory 410; communication interface(s) 404 for coupling the client with and communicating with other clients and servers in the network environment of FIG. 1, via the communication networks 108; and at least one bus 412 that interconnects these components. Each client may also include a user interface 405, such as a display 406 and a keyboard/mouse 408. In some embodiments, one or more of the clients in the system includes a subset and/or superset of the aforementioned components.

The memory 410 includes high-speed random access memory and may include non-volatile memory, such as one or more magnetic disk storage devices. In some embodiments, the memory 410 may include mass storage that is remotely located from the central processing unit(s) 402. The memory 410 stores an operating system 414 that includes procedures for handling basic system services and for performing hardware dependent tasks. Memory 410 also stores communications module or instructions 416 used for communicating with the content servers and, optionally, other computers such as other clients and one or more search engine servers in the network environment of FIG. 1.

The memory 410 also stores the following data structures, programs and instructions, or a subset or superset thereof:
- client application module (or instructions) 103, for displaying content, such as advertisements and/or web pages, to the user;
- one or more user demographic data structures 418, for holding user demographic data; and
- client assistant module (or instructions) 105.

The client application module (or instructions) 103 displays content to the user via user interface devices such as display 406. Exemplary client application modules 103 may include, without limitation, web browsers and electronic messaging programs.

Client 102 may also include a client assistant module (or instructions) 105. The client assistant 105 may be an add-on, plug-in, or any other module that provides additional functionality to client 102.

The one or more user demographic data structures 418 hold user demographic data for one or more users. In some embodiments, the user demographic data structure may be a table, such as the one described above in relation to FIG. 2B. In alternative embodiments, other data structures, such as cookies, may be used.

Each of the above identified modules or procedures corresponds to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 410 may store a subset of the modules and data structures identified above. Furthermore, memory 410 may store additional modules and data structures not described above.

Figure 5:
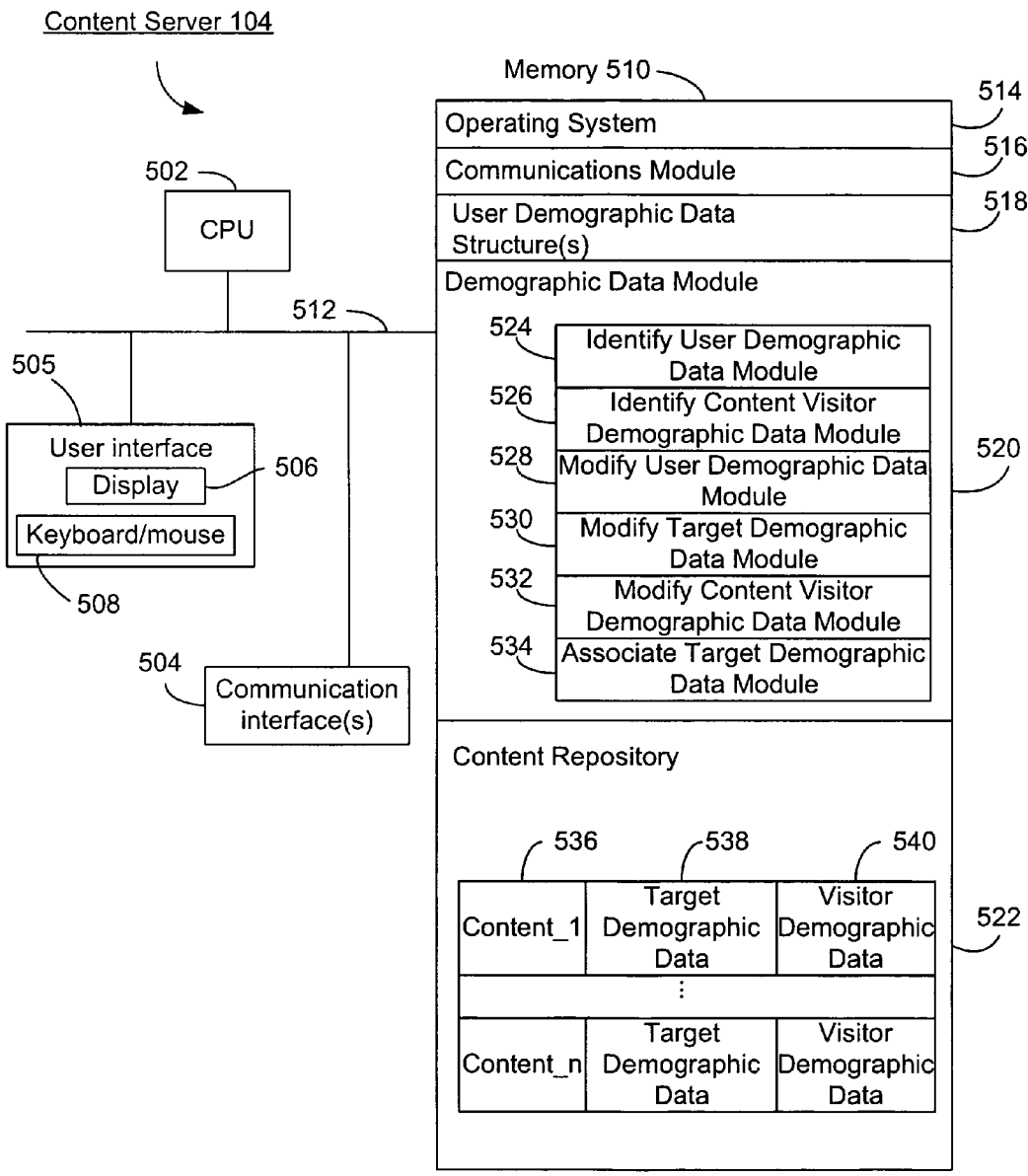
FIG. 5 is a block diagram illustrating an exemplary content server, according to some embodiments of the invention.

FIG. 5 illustrates an exemplary content server 104, according to some embodiments of the invention. Content server 104 includes: at least one data processor or central processing unit (CPU) 502; memory 510; communications interface(s) 504 for coupling the content server with and communicating with clients and other servers in the network environment of FIG. 1, via the communication networks 108; and at least one bus 512 that interconnects these components. A content server may optionally include a user interface 505, such as a display 506 and a keyboard/mouse 508.

The memory 510 includes high-speed random access memory and may include non-volatile memory, such as one or more magnetic disk storage devices. In some embodiments, the memory 510 may include mass storage that is remotely located from the central processing unit(s) 502. The memory 510 stores an operating system 514 that includes procedures for handling basic system services and for performing hardware dependent tasks. Memory 510 also stores communications module or instructions 516 used for communicating with clients, content servers, and search engine servers on the network environment of FIG. 1.

The memory 510 also stores the following data structures, programs and instructions, or a subset or superset thereof:
- user demographic data structure(s) 518, for storing the user demographic data of a plurality of users;
- target demographic data module (or instructions) 520, for performing various operations regarding demographic data; and
- content repository 522, for storing content and associated target demographic data and visitor demographic data.

User demographic data structure 518 stores user identifiers and, for each user identified, a plurality of demographic characteristics and associated probabilities. In some embodiments, the user demographic data structure may take on the form of the data structures described above in relation to FIG. 2A. In alternative embodiments, the user demographic data structure may take on different forms. As noted below, in some embodiments, the content server 104 does not store a persistent user demographic data structure. Instead, to protect the privacy of user demographic data, the user demographic data is used by the content server 104 only to update visitor demographic data and is not persistently stored.

Target demographic data module (or instructions) 520 performs various tasks regarding demographic data. Target demographic data module 520 may include sub-modules (or instructions) for each task. In some embodiments, there is an identify user demographic data module (or instructions) 524 for identifying user demographic data of a user; identify content visitor demographic data module (or instructions) 526 for identifying the visitor demographic data of content; modify user demographic data module (or instructions) 528 for modifying user demographic data of a user; modify target demographic data module (or instructions) 530 for modifying target demographic data of content; modify content visitor demographic data module (or instructions) 532 for modifying visitor demographic data; and associate target demographic data module (or instructions) 534 for associating a target demographic with content by making the target demographic the target demographic data of the content.

Content repository 522 stores content. Each item or instance of content 536 is associated with a target demographic data 538, which is the content provider's desired target demographic for the respective content, and a visitor demographic data 540, which is the aggregate of the user demographic data of users who have selected the respective content.

Each of the above identified modules or procedures corresponds to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 510 may store a subset of the modules and data structures identified above. Furthermore, memory 510 may store additional modules and data structures not described above.

Although FIG. 5 shows content provider 104 as a number of discrete items, FIG. 5 is intended more as a functional description of the various features which may be present in content provider 104 rather than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers in content server 104 and how features are allocated among them will vary from one implementation to another, and may depend in part on the amount of data traffic that the system must handle during peak usage periods as well as during average usage periods.

In some embodiments, some of the tasks performed by content server 104 may be performed by client assistant 105 instead. For example, if the user demographic data is stored at the client 102, the user demographic data may be modified by client assistant 105, rather than by content server 104. Rather than modifying the user demographic data at the server and sending the modified data to client 102, content server 104 may send the relevant target demographic data to client assistant 105, and client assistant 105 uses the target demographic data to modify the user demographic data locally. As result, module 528 may be located in the client (e.g., as part of the client assistant 105) and not in the content server. Similarly, module 532 may be located in the client (e.g., as part of the client assistant 105), and the content server may send to the client visitor demographic data for updating. By keeping the user demographic data at the client 102, and performing associated update operations at the client, privacy of the user demographic data can be maintained.

In alternative embodiments, all demographic data, of users and content, are stored at the content server 104. In that case, client 102, after a user selection of content, needs only send the user ID to the content server 104. After the demographic data are modified in accordance with the process of FIG. 3, the data are stored at content server 104 and does not need to be sent to client 102.

In the embodiments described above, it is assumed that each client 102 has only one user and that each user only uses one client 102, and thus whatever user demographic data is stored at a client 102 and/or at content server 104 is the complete demographic data for a single user. Furthermore, due to the use of cookies, the user demographic data is associated with the particular client application through which the user selected content. However, a client may support multiple users, e.g., via separate logins. Additionally, users may use different clients applications and/or clients at different times. In these situations, the user demographic data stored may be the demographic data of all users who share the same login at the particular client and using a particular client application. Also, the user demographic data, even if it is the demographic data of a single user, may be incomplete, as the user may have used another client application and/or client and have user demographic data based on the user's content selection at that client. User demographic data for a single user, from multiple clients or client applications may be aggregated by either a client or content server, by accessing the user demographic data associated with particular user and each of the clients or client applications and then summing, combining or otherwise aggregating those sets of user demographic data.

The embodiments of the invention described above may be extended to resolve these issues. For example, the user may be asked to log into the client application. The login at the client application helps to distinguish between users who share the same login at the client. Additionally, multiple user ID's may be registered and associated with a single user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of inferring demographic information, comprising:
at a server system including one or more processors and memory storing one or more programs, the one or more processors executing the one or more programs to perform the operations of:
incrementally updating demographic data stored in memory of the server system in response to a respective access of content by a respective user, wherein updating demographic data comprises:
    identifying user demographic data for the respective user, wherein the user demographic data includes demographic characteristics associated with the respective user;
    modifying the user demographic data in accordance with demographic data associated with the content accessed by the respective user to produce modified user demographic data;
    identifying visitor demographic data for the content accessed by the respective user, wherein the visitor demographic data is an aggregate of the user demographic data of users who accessed the content;
    modifying the visitor demographic data for the content in accordance with the user demographic data for the respective user; and
repeating the updating in response to a plurality of successive content access operations by a plurality of respective users over time, including modifying the user demographic data for a respective user in accordance with the modified visitor demographic data associated with content accessed by the respective user.

2. The method of claim 1, wherein the content comprises an advertisement.

3. The method of claim 1, wherein the content comprises a web page.

4. The method of claim 1, wherein the user demographic data comprises at least one demographic characteristic and a probability value associated with the at least one demographic characteristic.

5. The method of claim 1, wherein the user demographic data is stored at a client.

6. The method of claim 1, wherein the user demographic data is stored at the server.

7. The method of claim 1,
wherein incrementally updating demographic data in response to a respective access of content by a respective user further comprises:
    identifying target demographic data associated with the content accessed by the respective user; and
    modifying the identified target demographic data in accordance with the visitor demographic data for the content accessed by the respective user.

8. A system for inferring demographic data, comprising:
one or more processors;
memory storing one or more programs for execution by the one or more processors; and
a demographic data module including instructions, executable by the one or more processors, for:
    incrementally updating demographic data in response to a respective access of content by a respective user, wherein updating demographic data comprises:
        identifying user demographic data for the respective user, wherein the user demographic data includes demographic characteristics associated with the respective user;
        modifying the user demographic data in accordance with demographic data associated with the content accessed by the respective user to produce modified user demographic data;
        identifying visitor demographic data for the content accessed by the respective user, wherein the visitor demographic data is an aggregate of the user demographic data of users who accessed the content; and
        modifying the visitor demographic data for the content in accordance with the user demographic data for the respective user; and
    repeating the updating in response to a plurality of successive content access operations by a plurality of respective users over time, including modifying the user demographic data for a respective user in accordance with the modified visitor demographic data associated with content accessed by the respective user.

9. The system of claim 8, wherein the content comprises an advertisement.

10. The system of claim 8, wherein the content comprises a web page.

11. The system of claim 8, further comprising a data structure for storing the user demographic data of the user.

12. The system of claim 11, wherein the data structure for storing the user demographic data comprises at least one demographic characteristic for the user and a probability value associated with the at least one demographic characteristic for the user.

13. The system of claim 8, wherein the instructions for incrementally updating demographic data in response to a respective access of content by the respective user further comprises instructions for:
    identifying target demographic data associated with the content accessed by the respective user; and
    modifying the identified target demographic data in accordance with the visitor demographic data for the content accessed by the respective user.

14. A non-transitory computer readable storage medium storing one or more programs for execution by one or more processors of a server system, the computer readable storage medium including instructions for inferring demographic information, comprising instructions for:
    incrementally updating demographic data in response to a respective access of content by a respective user, wherein updating demographic data comprises:
        identifying user demographic data for the user, wherein the user demographic data includes demographic characteristics associated with the respective user;
        modifying the user demographic data in accordance with demographic data associated with the content accessed by the respective user to produce modified user demographic data;
        identifying visitor demographic data for the content accessed by the respective user, wherein the visitor demographic data is an aggregate of the user demographic data of users who accessed the content;
        modifying the visitor demographic data for the content in accordance with the user demographic data for the respective user; and
    repeating the updating in response to a plurality of successive content access operations by a plurality of respective users over time, including modifying the user demographic data for a respective user in accordance with the modified visitor demographic data associated with content accessed by the respective user.

15. The non-transitory computer readable storage medium of claim 14, wherein the content comprises an advertisement.

16. The non-transitory computer readable storage medium of claim 14, wherein the content comprises a web page.

17. The non-transitory computer readable storage medium of claim 14, wherein the user demographic data comprises at least one demographic characteristic and a probability value associated with the at least one demographic characteristic.

18. The non-transitory computer readable storage medium of claim 14, wherein the instructions for incrementally updating demographic data further comprise instructions for:
  identifying target demographic data associated with the content accessed by the respective user; and
  modifying the identified target demographic data in accordance with the visitor demographic data for the content accessed by the respective user.

19. The method of claim 1, wherein the visitor demographic data for the content comprises a value for a demographic characteristic selected from the group consisting of age, gender, income, geographic location, education, wealth, religion, race, ethic group, marital status, household size, employment status, and political party affiliation.

20. The system of claim 8, wherein the visitor demographic data for the content comprises a value for a demographic characteristic selected from the group consisting of age, gender, income, geographic location, education, wealth, religion, race, ethic group, marital status, household size, employment status, and political party affiliation.

21. The non-transitory computer storage medium of claim 14, wherein the visitor demographic data for the content comprises a value for a demographic characteristic selected from the group consisting of age, gender, income, geographic location, education, wealth, religion, race, ethic group, marital status, household size, employment status, and political party affiliation.

\* \* \* \* \*

UNITED STATES PATENT AND TRADEMARK OFFICE
CERTIFICATE OF CORRECTION

PATENT NO.        : 9,003,441 B1
APPLICATION NO.   : 11/105781
DATED             : April 7, 2015
INVENTOR(S)       : Jindal et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2157 days.

Signed and Sealed this
Fifteenth Day of March, 2016

Michelle K. Lee
*Director of the United States Patent and Trademark Office*